United States Patent Office 3,132,019
Patented May 5, 1964

---

3,132,019
METHOD OF ELIMINATING WEED GRASSES
Quentin F. Soper, Indianapolis, Ind., assignor to Eli Lilly and Company, Indianapolis, Ind., a corporation of Indiana
No Drawing. Filed Dec. 18, 1961, Ser. No. 160,313
6 Claims. (Cl. 71—2.5)

This invention relates to novel processes for eliminating seedling weed grasses and to compositions useful in these novel processes. More particularly, this invention relates to novel processes for eliminating seedling weed grasses employing compositions in which a 2-amino-3-nitropyridine or a 2-hydrazino-3-nitropyridine is the active ingredient.

This invention provides a novel process for the elimination of seedling weed grasses which comprises applying to an area infested with seedling weed grasses and weed grass seeds, an effective amount of a compound represented by the following formula

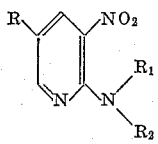

wherein R can be hydrogen, halogen, trifluoromethyl, or lower alkyl having from 1–4 carbon atoms, $R_1$ can be hydrogen, lower alkyl, lower alkenyl, lower alkynyl, amino, alkylamino, dialkylamino, or monocyclic arylamino, $R_2$ can be hydrogen, lower alkyl, lower alkenyl or lower alkynyl and $R_1$ and $R_2$, when taken together, can be an alkylene chain having from 4–5 carbon atoms. A given compound can be applied to the infested area either as the free base or in the form of an acid addition salt.

Halogen atoms which R represents include bromine, fluorine, chlorine, iodine and astatine. When R is an alkyl group having from 1–4 carbon atoms, it can be illustratively methyl, ethyl, n-propyl, isopropyl, n-butyl, isobutyl, sec-butyl, or t-butyl. When $R_1$ and $R_2$ represent lower alkyl, lower alkenyl or lower alkynyl groups, they can be illustratively methyl, ethyl, isopropyl, allyl, n-propyl, crotyl, propargyl, 2-butynyl, n-butyl, isobutyl, n-amyl, methallyl, and the like. When $R_1$ is an alkylamino, dialkylamino or monocyclic arylamino group, it can be, for example, methylamino, dimethylamino, ethylamino, diethylamino, N-methyl-ethylamino, anilino, 2,4-dinitroanilino and the like.

Illustrative free bases coming within the scope of the above formula include the following:

2-amino-3-nitropyridine
2-di-n-butylamino-3-nitropyridine
2-isoamylamino-3-nitropyridine
2-pyrrolidino-3-nitro-5-trifluoromethylpyridine
2-piperidino-3-nitro-5-chloropyridine
2-methylamino-3-nitro-5-bromopyridine
2-ethylamino-3-nitro-5-fluoropyridine
2-isopropylamino-3-nitro-5-ethylpyridine
2-(β,β-dimethylhydrazino)-3-nitro-5-isopropylpyridine
2-[β-(4-chlorophenyl)hydrazino]-3-nitro-5-n-butylpyridine
2-[β-(2-methoxyphenyl)hydrazino]-3-nitro-5-sec-butylpyridine
2-β-o-tolylhydrazino-3-nitro-5-n-propylpyridine
2-β-ethylhydrazino-3-nitropyridine
2-β-n-propylhydrazino-3-nitro-5-fluoropyridine
2-allylamino-3-nitro-5-chloropyridine
N-methyl-N-allyl-2-amino-3-nitro-5-iodopyridine
2-methallylamino-3-nitropyridine
N-methyl-N-n-propyl-2-amino-3-nitropyridine Illustrative acids which can be used to prepare the acid addition salts of the 2-amino or 2-hydrazinopyridine represented by the above formula include: inorganic acids such as hydrochloric acid, hydrobromic acid, sulfuric acid, nitric acid, phosphoric acid, and the like as well as organic acids such as acetic acid, trichloroacetic acid, benzoic acid, 2,4-dinitrobenzoic acid, succinic acid, tartaric acid, phthalic acid and the like.

Compounds represented by the above formula either as the free base or as an acid addition salt thereof preferably are formulated for use as pre-emergent herbicides either as sprays made up by adding water to emulsifiable concentrates or wettable powders, as granules, or as dispersions on carriers such as peat moss or vermiculite. The compounds are quite insoluble in water, and hence for the preparation of emulsions or wettable powders, the compounds are preferably formulated with wetting agents.

The novel processes of this invention comprise treating an area infested with seedling weed grasses or weed grass seeds with a granular formulation, a dispersion on an inert carrier, or a spray containing a 2-amino or 2-hydrazino-3-nitropyridine coming within the scope of the above formula as the herbicidally active ingredient. Typical of areas from which grasses can be eliminated are gravel walks, shoulders of roads, fence rows, clay tennis courts, drainage ditches, brush-infested woodland areas, and the like. In addition, herbicidal formulations containing a 2-amino or 2-hydrazino-3-nitropyridine can be applied between rows of crops in crop-bearing areas, as for example in corn, cotton, soybean, or tomato fields, strawberry patches, and the like. It is a considerable advantage of this invention that the 2-amino or 2-hydrazino-3-nitropyridine as defined above can be employed as a pre-emergent herbicidal composition at the time of planting of such crop plants as corn, cotton, soybeans, lima beans, snap beans, wheat, okra, sugar beets, sorghum, cucumbers, etc. When thus applied, the herbicidal compositions of this invention will eliminate germinating weed grasses without affecting the growth of the germinating crop plant.

In eliminating seedling grasses from areas infested therewith, the herbicidally active 2-amino or 2-hydrazino-3-nitropyridine is distributed to the area in a suitable formulation, by methods well known to the art, at the rate of from 1 to 16 lbs. per acre. For most purposes I prefer to apply the herbicidal compositions of this invention at the rate of from 2 to 8 lbs. of active ingredient per acre. However, if a granular formulation is employed, I prefer to use about twice the amount of active ingredient per acre as when a spray formulation is used, since the active ingredient becomes available more slowly from a granular formulation.

Seedling grasses which are eliminated by the application of a herbicidal composition as provided by this invention include the crabgrasses (*Digitaria sanguinalis* and *Digitaria ischaemum*); Japanese millet (*Echinochloa crusgalli* var. *frumentacea*); German millet (*Setaria italica*); yellow foxtail (*Setaria lutescens*); Bermuda grass (*Cynodon dactylon*); Kentucky bluegrass (*Poa pratensis*); fescues (Festuca sp.); bentgrass (*Agrostis lenuis*); goosegrass (*Eleusime indica*); Johnson grass (*Sorghum halepense*); and perennial rye-grass (*Lolium perenne*). In addition, compounds represented by the above formula have the advantage of not affecting the crop grasses, corn and wheat, in the seedling stage at rates of application which will eliminate the above weed grasses.

This invention is further illustrated by the following specific examples:

EXAMPLE 1

The ability of the compositions of this invention to kill germinating and seedling weed grasses was demonstrated by the following experimental procedure: A soil was prepared consisting of one part masonry sand and one part shredded top soil blended together in a cement mixer. One gallon of this soil was placed in a 25 x 35 cm. galvanized flat and was patted down with a bench brush until level. A three-row marker was used to make 2½ cm. deep furrows in approximately two-fifths of the flat. Crop seeds consisting of four kernels of corn, five cotton seeds and five soybean seeds were placed in these furrows. A four-row template was then placed on the remaining soil, and the indicated amounts of each of the following seeds were planted, one species to each section: German millet, 100 mg.; broad-leaf mustard (*Brassica juncea*), 50–5 mg.; rough pigweed, 30–50 mg.; and large crabgrass, 350–400 mg. Sufficient soil was added to cover the entire flat. Thus, the weed seeds were covered to a depth of about 6 mm. and the crop plant seeds were covered to a depth of about 3 cm.

In assaying the effect of the compositions as preemergent herbicides, a flat prepared as above, taken either on the day of planting or on the next day, was placed in a chamber equipped with a turntable and an air exhaust. The herbicidal composition, whether it was a spray-type emulsion or a wettable powder, was applied to the flat with a modified DeVilbiss atomizer hooked to an air source. Twelve and one-half ml. of the composition under test were applied to each flat either on the day of planting or the succeeding day. Injury ratings and observations as to type of injury were made in either case eleven to twelve days after treatment. The injury rating scale used was as follows:

0—no injury
1—slight injury
2—moderate injury
3—severe injury
4—death

When more than one determination was carried out, an average value was calculated for the injury rating.

The following table sets forth the results of preemergent testing of several 3-nitropyridine compounds. In the table, column 1 gives the name of the compound; column 2, the rate in terms of pounds per acre at which the compound was applied to the test flat; and columns 3 through 9, the injury rating for the particular plant seeds or seedlings.

has been described above, the herbicidally active compounds of the present invention can be formulated as wettable powders and also in granular form suitable for spreading. An additional emulsifiable concentrate suitable for dilution with water to form a herbicidal spray containing 0.7 lb. of 2-amino-3-nitro-5-methylpyridine per gallon is prepared as follows: 350 g. of 2-amino-3-nitro-5-methylpyridine are dissolved in a three-component solvent containing 1840 g. of ethanolamine, 571 g. of acetone, and 1027 g. of dimethylformamide. Finally, 95 g. of nonyl phenoxy polyoxyethylene ethanol surfactant are added.

Other 3-nitropyridines, as for example, 2-diallylamino-3-nitro-5-chloropyridine, 2-dipropargylamino-3-nitropyridine, and 2-β-phenylhydrazino-3-nitro-5-trifluoromethylpyridine, can be substituted for the 3-nitropyridines used in the above formulations and applied to infested areas as pre-emergent weed grass herbicides with equally satisfactory results. Likewise, acid addition salts of any of the above free bases can be employed in place of the free base itself with equally satisfactory results provided that the same amount of the free base which is the active ingredient is present.

The substituted 2-amino or 2-hydrazino-3-nitropyridines useful in the compositions and processes of this invention are high-melting yellow to orange-colored solids. Compounds in which $R_1$ and $R_2$ are hydrogen are prepared by the method of Seide, Berichte, 57, 791, 1802, (1924). Compounds in which $R_1$ or $R_2$ are substituents other than hydrogen are prepared by heating a 2-chloro-3-nitropyridine with the desired primary or secondary amine, hydrazine, or substituted hydrazine, in an inert solvent if desired. For example, 2-di-n-propylamino-5-methyl-3-nitropyridine is prepared by heating 2-chloro-5-methyl-3-nitropyridine with an excess of di-n-propylamine. On the other hand, 2-hydrazino-3-nitro-5-methylpyridine can be prepared by reacting 2-chloro-3-nitro-5-methylpyridine with hydrazine hydrate in ethanol solution. Other inert solvents such as benzene, xylene, and diethyl ether can be employed in place of ethanol. Hydrogen chloride is produced as a by-product in the above metathetic reaction but it reacts immediately with the excess of amine or hydrazine present in the reaction medium.

Acid addition salts of 2-amino or 2-hydrazino-3-nitropyridines represented by the above formula are prepared

*Table I.—Injury Rating on Pre-Emergent Treatment*

| Compound | Lbs./Acre | Corn | Cotton | Soybean | Crabgrass | Mustard | Pigweed | Foxtail Millet |
|---|---|---|---|---|---|---|---|---|
| 2 - di - n - propylamino - 3 - nitro - 5-methylpyridine | 8 | 0 | 0 | 0 | 4 | 1 | 3 | 3 |
|  | 4 | 0 | 0 | 0 | 4 | 1 | 3 | 3 |
|  | 2 | 0 | 0 | 0 | 2 | 1 | 0 | 1 |
| 2-amino-3-nitro-5-methylpyridine | 8 | 1 | 2 | 0 | 4 | 3 | 3 | 4 |
|  | 4 | 0 | 1 | 0 | 4 | 2 | 3 | 4 |
|  | 2 | 0 | 0 | 0 | 3 | 0 | 0 | 3 |
|  | 1 | 0 | 0 | 0 | 3 | 0 | 0 | 0 |
| 2-hydrazino-3-nitro-5-methylpyridine | 8 | 0 | 0 | 0 | 3 | 0 | 0 | 4 |
|  | 2 | 0 | 0 | 0 | 1 | 0 | 0 | 1 |

In the above examples of the invention, the compound under test was formulated as a spray by one of the following procedures: In one method the compound was wetted by grinding in a mortar with one part of a dispersing agent such as polyoxyethylene sorbitan mono-oleate. Five hundred parts of water were added slowly to the resultant creamy paste to give an aqueous dispersion with a surfactant concentration of 0.2 percent. This dispersion was entirely satisfactory for spray application. In a second procedure the compound was dissolved in one volume of acetone, and the acetone solution was diluted with 19 volumes of water containing 0.1 percent of polyoxyethylene sorbitan monolaurate.

In addition to the spray formulations whose preparation by dissolving the free base in a solvent and adding to the resulting solution, a second solution containing an equivalent amount of the desired acid. If ether is used as a solvent, the acid addition salt is usually insoluble in the reaction medium and can be isolated by filtration. If, on the other hand, a solvent such as ethanol is used in which the acid addition salt of the amine is soluble, the salt is isolated by evaporation of the solvent. As is well known in the art, salts of acids which can be obtained in gaseous form, such as hydrogen chloride, can also be prepared by bubbling the gaseous acid into a solution of the amine. The resulting salt is, as before, isolated according to whether it is soluble or insoluble in the solvent employed.

The preparation of representative 2-amino-3-nitropyridines useful in the compositions and processes of this invention is illustrated below.

PREPARATION 1.—PREPARATION OF 2-CHLORO-3-NITRO-5-METHYLPYRIDINE 20 g. of 2-amino-3-nitro-5-methylpyridine were dissolved in 100 g. of 50 percent sulfuric acid (prepared by mixing equal volumes of water and 18 M sulfuric acid). The resulting solution was cooled to about 0° C. 15 g. of sodium nitrite were added with stirring to the chilled solution. The reaction mixture was stirred in the cold for about 1 hour and was then heated to about 70° C. for another hour. The acidity of the mixture was then adjusted to about pH 5.5 by the addition of 35 percent aqueous sodium hydroxide, thus precipitating 2-hydroxy-3-nitro-5-methylpyridine free base. The precipitate was collected by filtration and was dried. 2-hydroxy-3-nitro-5-methylpyridine thus prepared melted at about 255° C.

18 g. of 2-hydroxy-3-nitro-5-methylpyridine were added to a mixture of 100 cc. of phosphorus oxychloride and 10 g. of phosphorus pentachloride. The resulting mixture was heated to refluxing temperature for about 2 hours, thus forming 2-chloro-3-nitro-5-methylpyridine, and was then poured into about 1 liter of a mixture of cracked ice and cold water. The mixture was stirred until the 2-chloro-3-nitro-5-methylpyridine crystallized. The aqueous layer was extracted with three 300 ml. portions of chloroform, thus dissolving the crystalline 2-chloro-3-nitro-5-methylpyridine. The chloroform extracts were combined and dried, and the chloroform was removed by evaporation in vacuo, leaving crude 2-chloro-3-nitro-5-methylpyridine as a residue. Recrystallization of the product from hexane gave purified 2-chloro-3-nitro-5-methylpyridine, M.P.=47–49° C.

PREPARATION 2.—PREPARATION OF 2-HYDRAZINO-3-NITRO-5-METHYLPYRIDINE 7.5 grams of 2-chloro-3-nitro-5-methylpyridine were dissolved in 40 ml. of anhydrous ethanol. 5 ml. of hydrazine hydrate were slowly added to the solution of the pyridine base, while maintaining the temperature of the reaction mixture below about 5° C. After all of the hydrazine hydrate had been added, the reaction mixture was heated for an additional half hour at about 70° C. and was then cooled to about 0° C. On cooling, crystals of 2-hydrazino-3-nitro-5-methylpyridine separated and the crystals were collected by filtration. 2-hydrazino-3-nitro-5-methylpyridine thus prepared melted at about 165° C.

2-hydrazino-3-nitro-5-methylpyridines in which the hydrazine grouping bears a substituent such as a β-phenyl or β-methyl group are prepared by reacting the substituted hydrazine with 2-chloro-3-nitro-5-methylpyridine according to the above reaction.

PREPARATION 3.—PREPARATION OF 2-DI-n-PROPYL-AMINO-3-NITRO-5-METHYLPYRIDINE

Following the procedure of Preparation 2, 4 grams of 2-chloro-3-nitro-5-methylpyridine were heated with 10 ml. of di-n-propylamine at 100° C. for about 4 hours, thus forming 2-di-n-propylamino-3-nitro-5-methylpyridine, which precipitated when the reaction mixture was cooled. The precipitate was collected by filtration and was dissolved in ether. The ether layer was washed several times with dilute sodium hydroxide solution and finally with water. The ether layer was separated and dried. The ether was removed by evaporation in vacuo, leaving as a residue 2-di-n-propylamino-3-nitro-5-methylpyridine.

Other monoalkyl and dialkylamino groups can be substituted in the 2-position of 5-methyl-3-nitropyridine by replacing di-n-propylamine in the above reaction with another monoalkyl or dialkyl amine.

Compounds useful in the processes of this invention in which the 5-methyl group is either absent or has been replaced by a halogen, by another alkyl group or by a trifluoromethyl group are prepared according to the procedures of the above examples; that is to say, the amino group of a 2-amino-3-nitropyridine optionally substituted in the 5-position of the pyridine ring, is diazotized and the diazonium salt decomposed to yield the corresponding 2-hydroxy compound. The hydroxy compound is in turn converted to the 2-chloro compound by the action of phosphorus pentachloride and phosphorus oxychloride. The 2-chloro compound in turn is reacted with an alkylamine, a dialkylamine, an alkyleneamine, a dialkyleneamine, an alkynylamine, a dialkynylamine, a hydrazine, or the like to yield the desired compound.

The 2-amino-3-nitropyridine starting materials in which the 5-substituent is hydrogen or an alkyl group are prepared by the method utilized for the preparation of 2-amino-3-nitro-5-methylpyridine. Starting materials in which the substituent in the 5-position is a trifluoromethyl group are prepared by reacting 5-nitro-6-aminonicotinic acid with sulfur tetrafluoride under pressure. Compounds in which the substituent in the 5-position is a halogen are prepared by a procedure analogous to that employed by Seide, Berichte, 57, 791, (1924), for the synthesis of the 5-methyl-2-amino-3-nitropyridine.

I claim:
1. A method of eliminating seedling weed grasses which comprises applying to an area infested with weed grass seeds and seedling weed grasses an effective amount of a member of the group consisting of a pyridine base and its acid addition salts said pyridine base being represented by the following formula

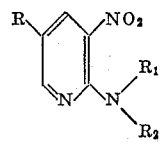

wherein R is a member of the group consisting of hydrogen, halogen, trifluoromethyl, and lower alkyl having from 1–4 carbon atoms; $R_1$ is a member of the group consisting of hydrogen, lower alkyl, lower alkenyl, lower alkynyl, amino, alkylamino, dialkylamino, and monocyclic arylamino; $R_2$ is a member of the group consisting of hydrogen, lower alkyl, lower alkenyl and lower alkynyl; and $R_1$ and $R_2$, when taken together, represent an alkylene chain having from 4–5 carbon atoms.

2. A method for destroying seedling weed grasses which comprises applying to a soil area infested with seedling weed grasses and weed grass seeds an effective amount of a composition comprising an inert diluent and a member of the group consisting of a 2-amino-3-nitropyridine and its acid addition salts, said 2-amino-3-nitropyridine being represented by the following formula

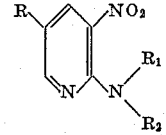

wherein R is a member of the group consisting of hydrogen, halogen, trifluoromethyl, and lower alkyl having from 1–4 carbon atoms; $R_1$ is a member of the group consisting of hydrogen, lower alkyl, lower alkenyl, lower alkynyl, amino, alkylamino, dialkylamino, and monocyclic arylamino; $R_2$ is a member of the group consisting of hydrogen, lower alkyl, lower alkenyl, and lower alkynyl; and $R_1$ and $R_2$, when taken together, represent an alkylene chain having from 4–5 carbon atoms.

3. A method of inhibiting the growth of seedling weed grasses which comprises applying to a soil area infested with seedling weed grasses and weed grass seeds from about 1 to about 16 lbs. per acre of a member of the group consisting of a pyridine base and its acid addition salts, said pyridine base being represented by the following formula

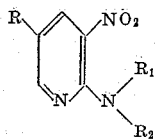

wherein R is a member of the group consisting of hydrogen, halogen, trifluoromethyl, and lower alkyl having from 1–4 carbon atoms; $R_1$ is a member of the group consisting of hydrogen, lower alkyl, lower alkenyl, lower alkynyl, amino, alkylamino, dialkylamino, and monocyclic arylamino, $R_2$ is a member of the group consisting of hydrogen, lower alkyl, lower alkenyl, and lower alkynyl; and $R_1$ and $R_2$, when taken together, represent an alkylene chain having from 4–5 carbon atoms.

4. The process of claim 3 wherein the herbicidally active compound is 2-hydrazino-3-nitro-5-methylpyridine.

5. The process of claim 3 wherein the herbicidally active compound is 2-di-n-propylamino-3-nitro-5-methylpyridine.

6. The process of claim 3 wherein the herbicidally active compound is 2-amino-3-nitro-5-methylpyridine.

References Cited in the file of this patent

UNITED STATES PATENTS 2,394,916     Jones _____ Feb. 12, 1946

FOREIGN PATENTS 198,997     Austria _____ Aug. 11, 1958

OTHER REFERENCES

Seide in Berichte, 57, pages 791 to 794 and 1802 to 1806.

Baumgarten et al.: J. Ameri. Chemical Society, 74, pages 3828 to 3831 (1952).